United States Patent [19]
Eng et al.

[11] Patent Number: 5,256,958
[45] Date of Patent: Oct. 26, 1993

[54] CONCENTRATOR-BASED GROWABLE PACKET SWITCH

[75] Inventors: Kai Y. Eng, Atlantic Highlands; Mark J. Karol, Fair Haven, both of N.J.; Mark A. Pashan, Wheaton, Ill.

[73] Assignee: AT&T Bell Laboratories, Murray Hill, N.J.

[21] Appl. No.: 797,849

[22] Filed: Nov. 26, 1991

[51] Int. Cl.$^5$ .............................................. H04Q 11/04
[52] U.S. Cl. .......................................... 370/56; 370/60
[58] Field of Search ............... 370/53, 55, 56, 58.1, 370/58.2, 58.3, 60, 60.1, 94.1

[56] References Cited

U.S. PATENT DOCUMENTS

| | | | |
|---|---|---|---|
| 4,603,416 | 7/1986 | Servel et al. | 370/60 |
| 4,754,451 | 6/1988 | Eng et al. | 370/60 |
| 4,760,570 | 6/1988 | Acampora et al. | 370/60 |
| 4,866,701 | 9/1989 | Giacopelli et al. | 370/60 |
| 4,868,813 | 9/1989 | Suzuki | 370/60 |
| 4,893,304 | 1/1990 | Giacopelli et al. | 370/60 |
| 4,955,017 | 9/1990 | Eng et al. | 370/60 |
| 5,034,946 | 7/1991 | Smith | 370/56 |
| 5,172,371 | 12/1992 | Eng et al. | 370/60 |

Primary Examiner—Douglas W. Olms
Assistant Examiner—Alpus H. Hsu
Attorney, Agent, or Firm—Thomas Stafford

[57] ABSTRACT

An m×n (m>n) output Packet Switch Unit is implemented by using an n×n Packet Switch Module and an m:n Concentrator. The arriving packet cells are supplied from the m Concentrator inputs to the n Concentrator outputs in a "first-in first-out" (FIFO) sequence. The Concentrator provides for buffering of arriving packet cells on the m Concentrator inputs in excess of available packet cell positions in the n Concentrator outputs until they can be supplied to a concentrator output in the FIFO sequence. In turn, packet cells from the n Concentrator outputs are supplied to n inputs of the Packet Switch Module which supplies them to appropriate output destinations associated with the n outputs of the Packet Switch Module. A plurality of the Concentrator-Based output Packet Switch Units is readily employed to implement any "larger" Packet Switch architecture.

10 Claims, 6 Drawing Sheets

CONCENTRATOR-BASED GROWABLE PACKET SWITCH

RELATED APPLICATION

Co-pending U.S. patent applications Ser. Nos. 07/739,928 and 07/739,931 were both filed on Aug. 2, 1991.

TECHNICAL FIELD

This invention relates to packet switching and, more particularly, to a growable packet switch architecture.

BACKGROUND OF THE INVENTION

Growable packet switch architectures are known in the art. These prior known architectures, however, were implemented by employing a plurality of m×n (m>n) Packet Switch Units. Although the use of m×n Packet Switch Units has heretofore made sense for growth to a larger packet switch, the individual Packet Switch Units still have to meet the requirement of being stand-alone Packet Switch Modules upon initial deployment. A prior growable packet switch architecture is disclosed in U.S. Pat. No. 4,955,017 issued to K. Y. Eng, M. J. Karol and Y. S. Yeh on Sep. 4, 1990. As such, the Packet Switch Unit would only have to have an equal number of inputs and outputs. In other words, an m×n Packet Switch Unit can only be used as an n×n Packet Switch Module upon initial installation. Deploying a full m×n Packet Switch Unit to be used as an n×n Packet Switch Module is wasteful and expensive. Indeed, such a development would incur unnecessary technical and financial risk. Thus, although the prior known m×n Packet Switch Units are satisfactory for certain applications, they are not satisfactory for use as stand-alone n×n Packet Switch Modules.

SUMMARY OF THE INVENTION

The problems and limitations with prior m×n Packet Switch Units are overcome, in accordance with the principles of the invention, by employing a unique Concentrator-Based Packet Switch Unit. To this end, an m:n Concentrator arrangement followed by an n×n Packet Switch Module is advantageously employed, in accordance with the invention, to realize the desired m×n Packet Switch Unit architecture.

In accordance with an aspect of the invention, the m:n Concentrator concentrates all arriving packet cells on the m inputs in a prescribed repetitive sequence to the n outputs. This is realized by temporarily buffering any arriving packet cells in excess of available packet cell positions in the n concentrator outputs and by supplying the packet cells arriving on the m inputs to the n outputs in the prescribed repetitive sequence. The prescribed sequence is, in accordance with an aspect of the invention, a "first-in first-out" (FIFO) sequence.

A plurality of the resulting Concentrator-Based m×n Packet Switch Units can readily be employed to realize a larger packet switch, as desired.

A technical advantage of this invention is that a stand-alone n×n Packet Switch Module can be initially deployed and, then, the m:n Concentrator can be later deployed to grow into a packet switch having a larger number of m inputs.

DETAILED DESCRIPTION

Figure 1:
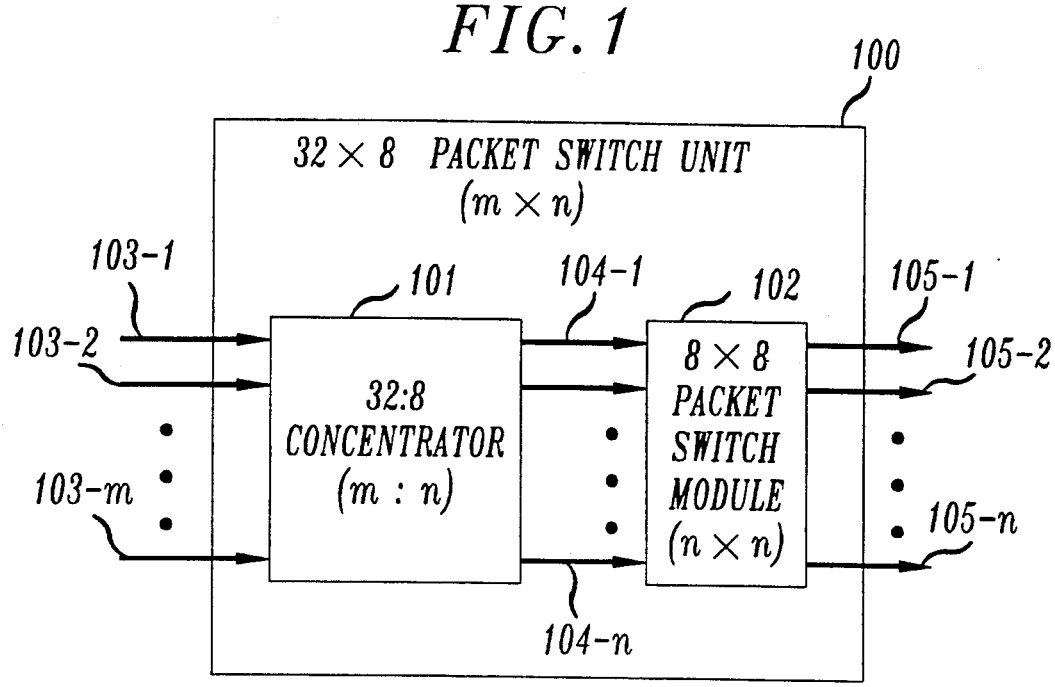
FIG. 1 shows, in simplified block diagram form, an embodiment of the invention including an m:n Concentrator in combination with an n×n Packet Switch Module.

FIG. 1 shows, in simplified block diagram form, an embodiment of the invention employing m:n Concentrator 101 in combination with n×n Packet Switch Module 102 to form m×n Packet Switch Unit 100. As indicated above it, is advantageous to be able to deploy n×n Packet Switch Module 102 as a stand-alone module and later grow, it in accordance with the invention, to m×n Packet Switch Unit 100. Again, this is realized, in accordance with the invention, by the unique utilization of a prior known n×n Packet Switch Module 102 and, then, employing m:n Concentrator 101 with it at a later date. The n×n Packet Switch Module 102 interrogates each arriving packet cell for its destination address and then routes it to the appropriate one of outputs 105-1 through 105-n. Multiple arriving packet cells destined for the same one of outputs 105 are allowed, and queuing is provided in Packet Switch Module 102 to buffer the multiple arriving packet cells properly so that they can be appropriately read out at the destination output one (1) packet cell at a time. Many techniques are known for implementing Packet Switch Module 102. However, employing a shared memory technique is preferred. As indicated, Packet Switch Module 102 may be one of known such modules (see for example, U.S. Pat. No. 4,603,416 or U.S. patent applications Ser. No. 07/739,931 and Ser. No. 07/739,928, both filed on Aug. 2, 1991 for examples of such Packet Switch Modules). As shown, Concentrator 101 has inputs 103-1 through 103-m and outputs 104-1 through 104-n which are supplied as inputs to Packet Switch Module 102. In turn, Packet Switch Module 102 has outputs 105-1 through 105-n. In the specific example shown in FIG. 1, m=32 and n=8, so that Concentrator 101 is a 32:8 (m:n) concentrator and Packet Switch Module 102 is an 8×8 (n×n) switch forming 32×8 (m×n) Packet Switch Unit 100.

Figure 2:
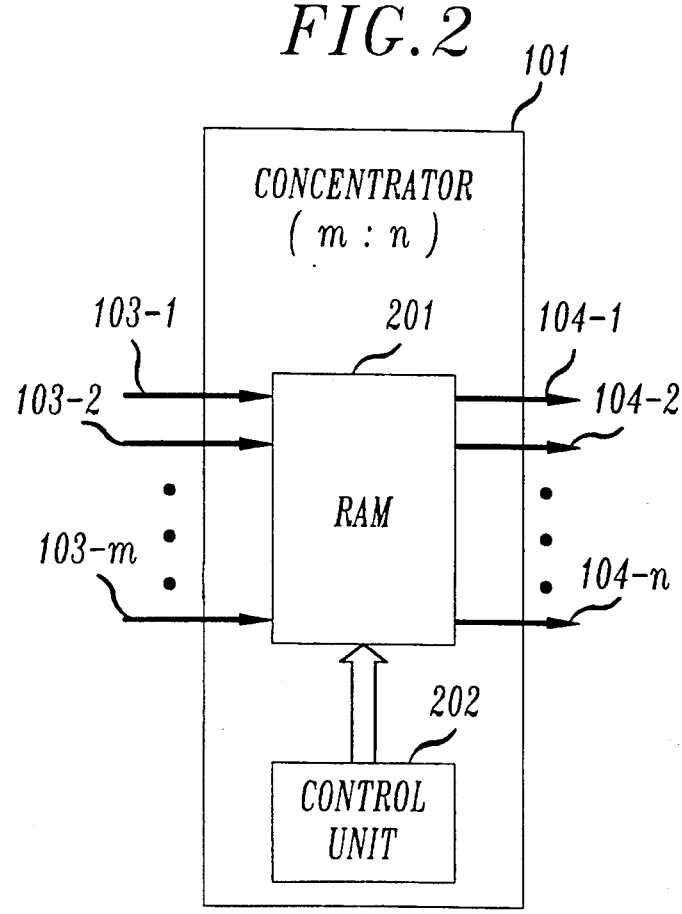
FIG. 2 depicts, in simplified block diagram form, details of the m:n Concentrator of FIG. 1.

FIG. 2 shows, in simplified form, details of one implementation of Concentrator 101 of FIG. 1. Specifically, shown is random access memory (RAM) 201 and control unit 202. RAM 201 is employed as a shared memory having an inputs 103-1 through 103-m (m=32 in this example) and n outputs 104-1 through 104-n (n=8 in this example) to form under control of control unit 202 the desired m:n Concentrator 101. It is noted that a multiplexer (not shown) is typically used to supply packet cells from inputs 103 to RAM 201 and that a demultiplexer (not shown) is typically used to supply packet cells from RAM 201 to outputs 104. Control unit 202 effects the writing of arriving packet cells from inputs 103 into RAM 201 and the reading of packet cells from RAM 201 to outputs 104 in the FIFO sequence. It should be noted that Concentrator 101 operates in a simpler manner than a packet switch. Unlike a packet switch, Concentrator 101 does not examine the address of each arriving packet cell. Its function is merely to concentrate all incoming packet cells to be supplied to outputs 104 on a first-in first-out (FIFO) basis. In this example, up to m (m=32) packet cells may arrive in one packet cell interval, i.e., time slot, but only n (n=8) packet cells can be supplied as outputs during a packet cell interval, i.e., time slot. The excessive packet cells are buffered temporarily in RAM 201 for FIFO operations. The long term average loading on Concentrator 101 cannot exceed the output capacity of its n outputs, but instantaneous fluctuations, of course, render the buffering of packet cells in RAM 201 necessary.

Figure 3:
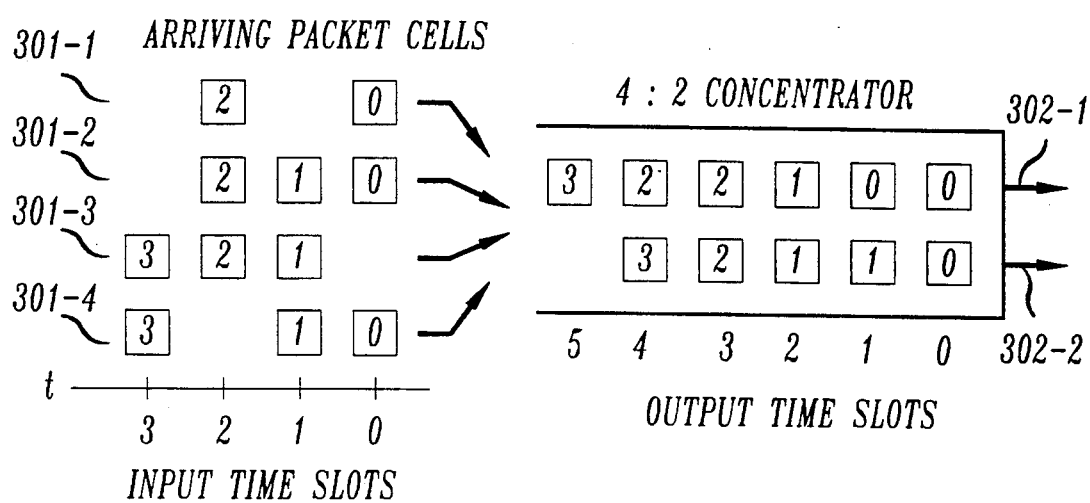
FIG. 3 graphically illustrates in a simplified manner the operation of the concentrator of FIG. 2.

FIG. 3 graphically illustrates the first-in first-out (FIFO) operation of RAM 201 under control of control unit 202 is realizing Concentrator 101 of FIG. 1. For clarity and brevity of description a 4:2 "first-in first-out" (FIFO) concentrator arrangement is described. It will be apparent to those skilled in the art how to expand the described concentrator operation to a 32.8 concentrator or any size concentrator, as desired. It is also noted that arriving packet cells in excess of the number of output lines to the concentrator are temporarily buffered. In this example, the arriving packet cells on inputs 301-1 through 301-4 are supplied to outputs 302-1 and 302-2 in a predetermined repetitive sequence. Specifically, the predetermined sequence in a particular time slot starts with any packet cell arriving on input 301-1 through any packet cell arriving on 302-4 and is repeated for each successive time slot. Thus, as shown in FIG. 3, packets are shown as arriving on inputs 301-1 through 301-4 in time slots 0 through 3 and are labeled accordingly. As shown, packet cells 0 arrive on inputs 301-1, 301-2 and 301-4 in input time slot 0. The arriving packet cell 0 on input 301-1 is immediately supplied to output 302-1 in output time slot 0 and the arriving packet cell 0 on input 301-2 is immediately supplied to output 302-2 in output time slot 0. The arriving packet cell 0 on input 301-4 must be temporarily stored in RAM 201 (FIG. 2) and, then, supplied to output 302-1 in the next output time slot, namely, output time slot 1. The packet cells arriving in input time slot 1 on inputs 301-2 through 301-4 are accordingly labeled 1. The packet cell 1 arriving on input 301-2 is immediately supplied to output 302-2 to be output in time slot 1. The packet cells 1 arriving on inputs 301-3 and 301-4 are temporarily stored in RAM 201 to be supplied to outputs 302-1 and 302-2, respectively, in output time slot 2. The arriving packet cells on inputs 301-1 through 301-3 in input time slot 2 are temporarily stored in RAM 201 to be supplied to 301-3 in input time slot 2 are temporarily stored in RAM 201 to be supplied to outputs 302-1 and 302-2 in time slots 3 and 4. Specifically, packet cell 2 arriving on input 301-1 is supplied to output 302-2 in output time slot 3 and arriving packet cell on input 301-2 is supplied to output 302-2 in output time slot 3. The packet cell 2 arriving on input 301-3 is supplied to output 302-1 in output time slot 4. The packet cells arriving on inputs 301-3 and 301-4 in input time slot 3 are appropriately labeled and are temporarily stored in RAM 201 to be supplied to outputs 302-1 and 302-2 in output time slots 4 and 5. Specifically, packet cell 3 arriving on input 301-3 is supplied to output 302-2 in output time slot 4 and packet cell 3 arriving on input 301-4 is supplied to output 302-1 in output time slot 5. Thus, it is readily seen that the arriving packet cells are supplied from inputs 301-1 through 301-4 to outputs 301-1 and 301-2 in the predetermined repetitive sequence, i.e., in a "first-in first-out" (FIFO) basis.

Briefly, it is important to note that prior m×n Packet Switch Units (m>n) were used in prior packet switch architectures even at initial switch deployment. As indicated above, for a stand-alone n×n Packet Switch Module application, the extra input ports in the prior m×n Packet Switch Units are wasteful from both an equipment and an economic standpoint. By employing our unique Concentrator 101 (FIG. 1) and Packet Switch Module 102 embodiment of the invention, the initial deployed equipment is kept to a minimum and, furthermore, the n×n Packet Switch Module 102 can be reused upon expansion when an m:n Concentrator 101 is added to form Packet Switch Unit 100, in accordance with the invention. Indeed, the resulting Packet Switch Unit 100 does not incur any waste as in the prior art. In addition, it will be apparent to those skilled in the art that use of FIFO based Concentrator 101 provides a much simpler control mechanism than a single-stage m×n Packet Switch Unit.

Figure 4:
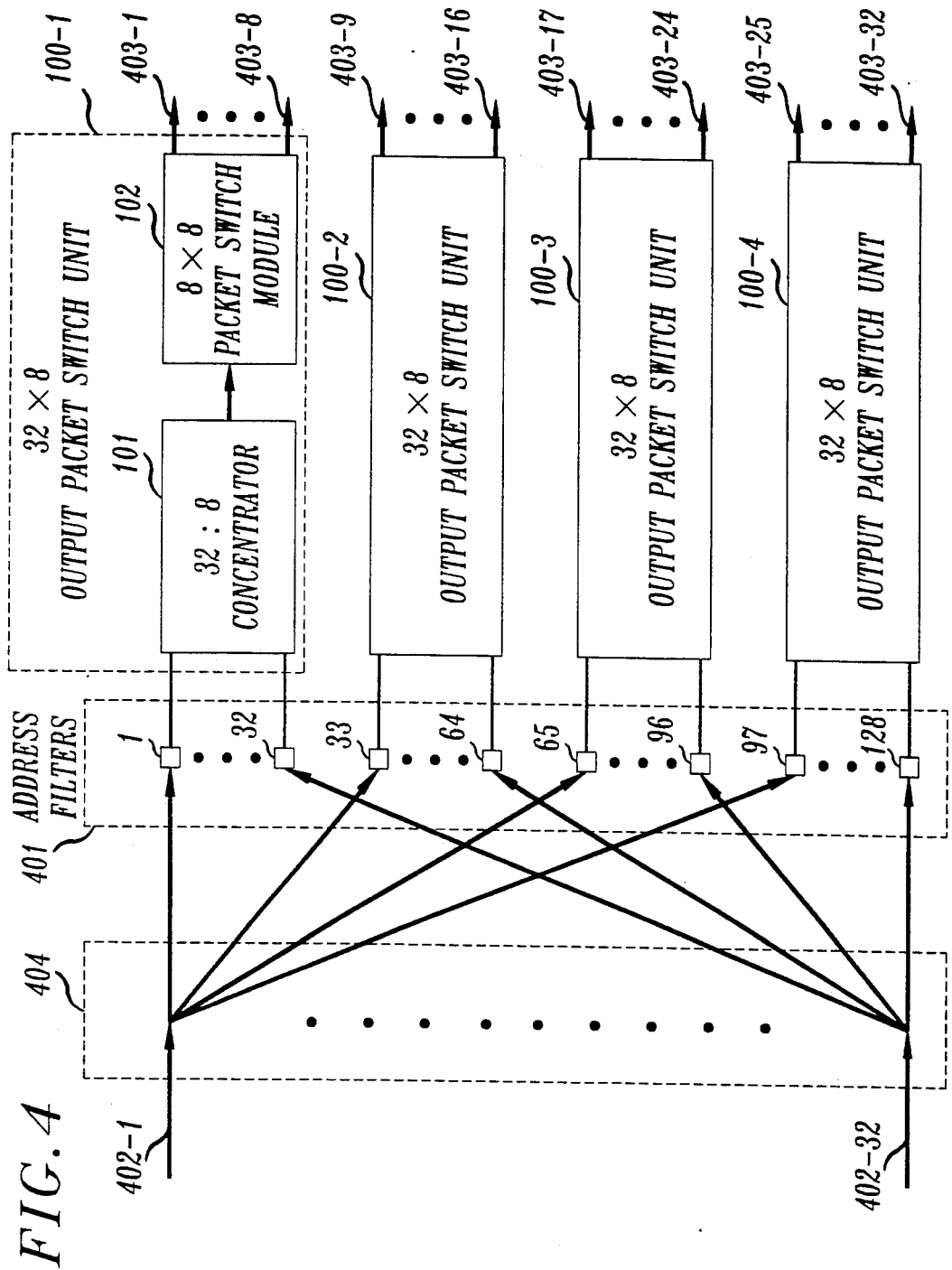
FIG. 4 depicts, in simplified block diagram form, a m×m packet switch (m=32 as an example) formed by employing the invention of FIG. 1.

FIG. 4 shows, in simplified block diagram form, an m×m Packet Switch matrix employing a plurality of Packet Switch Units 100, each including Concentrator 101 and Packet Switch Module 102 in accordance with the invention. Specifically, shown is address filter bank 401 including a plurality of address filters. Inputs 402-1 through 402-32 are supplied via broadcast unit 404 to each group of 32 address filters in address filter bank 401. Address filters 1 to 32 in address filter bank 401 are associated with and supply packet cells from inputs 402 to output Packet Switch Unit 100-1 and, therein, with Concentrator 101. Address filters 33 through 64 in address filter bank 401 are associated with and supply packet cells from inputs 402 to output Packet Switch Unit 100-2. Address filters 65 through 96 in address filter bank 401 are associated with and supply packet cells from inputs 402 to output Packet Switch Unit 100-3. Address filters 97 through 128 in address filter bank 401 are associated with and supply packet cells from inputs 402 to output Packet Switch Unit 100-4. Such address filters employed in address filter bank 401 are known in the art and are employed to interrogate the destination address in arriving packet cells on inputs 402-1 through 402-32 to determine if they are destined for one of the outputs 403 from a Packet Switch Module 102 in the associated one of output Packet Switch Units 100. If so, the packet cell is accepted, otherwise it is discarded immediately. Therefore, each of output Packet Switch Units 100 only has to process "valid" packet cells destined for their associated ones of outputs 403. As shown, outputs 403-1 through 403-8 are associated with output Packet Switch Unit 100-1, outputs 403-9 through 403-16 are associated with output Packet Switch Unit 100-2, outputs 403-17 through 403-24 are associated with output Packet Switch Unit 100-3 and, finally, outputs 403-25 through 403-32 are associated with output Packet Switch Unit 100-4. Thus, it can be seen, that four (4) parallel 32×8 output Packet Switch Units 100-1 through 100-4, each including an embodiment of the invention, are readily used to expand to, in this example, a 32×32 packet switch matrix.

Figure 5:
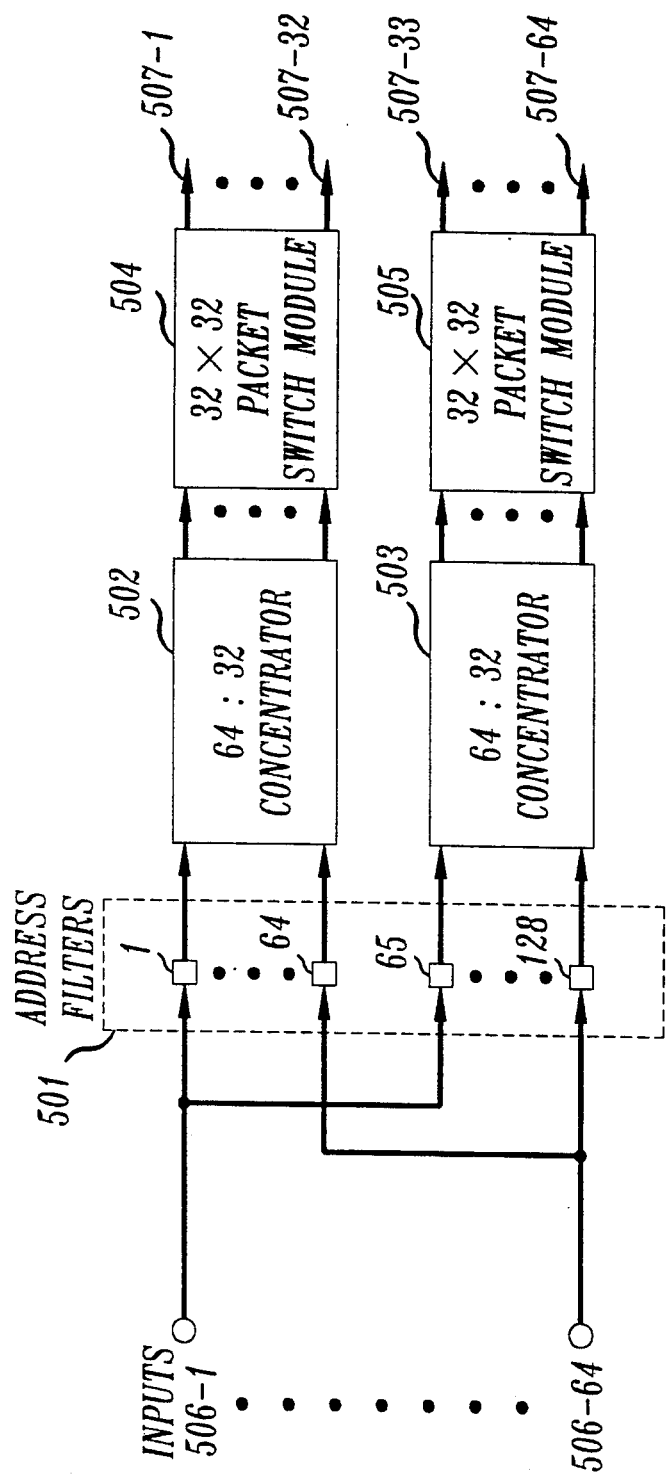
FIG. 5 shows, in simplified block diagram form, a larger packet switch (64×64 as an example) using a variation of the invention shown in FIG. 1.

FIG. 5 shows, in simplified block diagram form, another possible packet switch arrangement utilizing the principles of the invention. In this example, a 64×64 packet switch matrix is shown. It is assumed that a 32×32 Packet Switch Module has already been implemented according to the aforementioned description. To this end, a bank of address filters 501 is shown, including address filters 1 through 64 which supply arriving packet cells from inputs 506-1 through 506-64 to Concentrator 502. Similarly, address filters 65 through 128 in address filter bank 501 supply arriving packet cells from inputs 506-1 through 506-64 to Concentrator 503. Address filters 1 through 128 in address filter bank 501 operate as described above to interrogate the output addresses in the arriving packet cells to determine if they are destined for outputs 507-1 through 507-32 of Packet Switch Module 504 or for outputs 507-33 through 507-64 of Packet Switch Module 505. Again, only those arriving packet cells destined for Packet Switch Module 504 are supplied to Concentrator 502 and only those arriving packet cells destined for Packet Switch Module 505 are supplied to Concentrator 503. In this example, each of Concentrators 502 and 503 is a 64:32 concentrator and each operates in a "first-in first-out" manner as described above regarding Concentrator 101. Packet Switch Module 504 is associated with Concentrator 502 and, in this example, is a 32×32 packet switch. Similarly, Packet Switch Module 505 is associated with Concentrator 503 and also provides a 32×32 packet switch.

Figure 6:
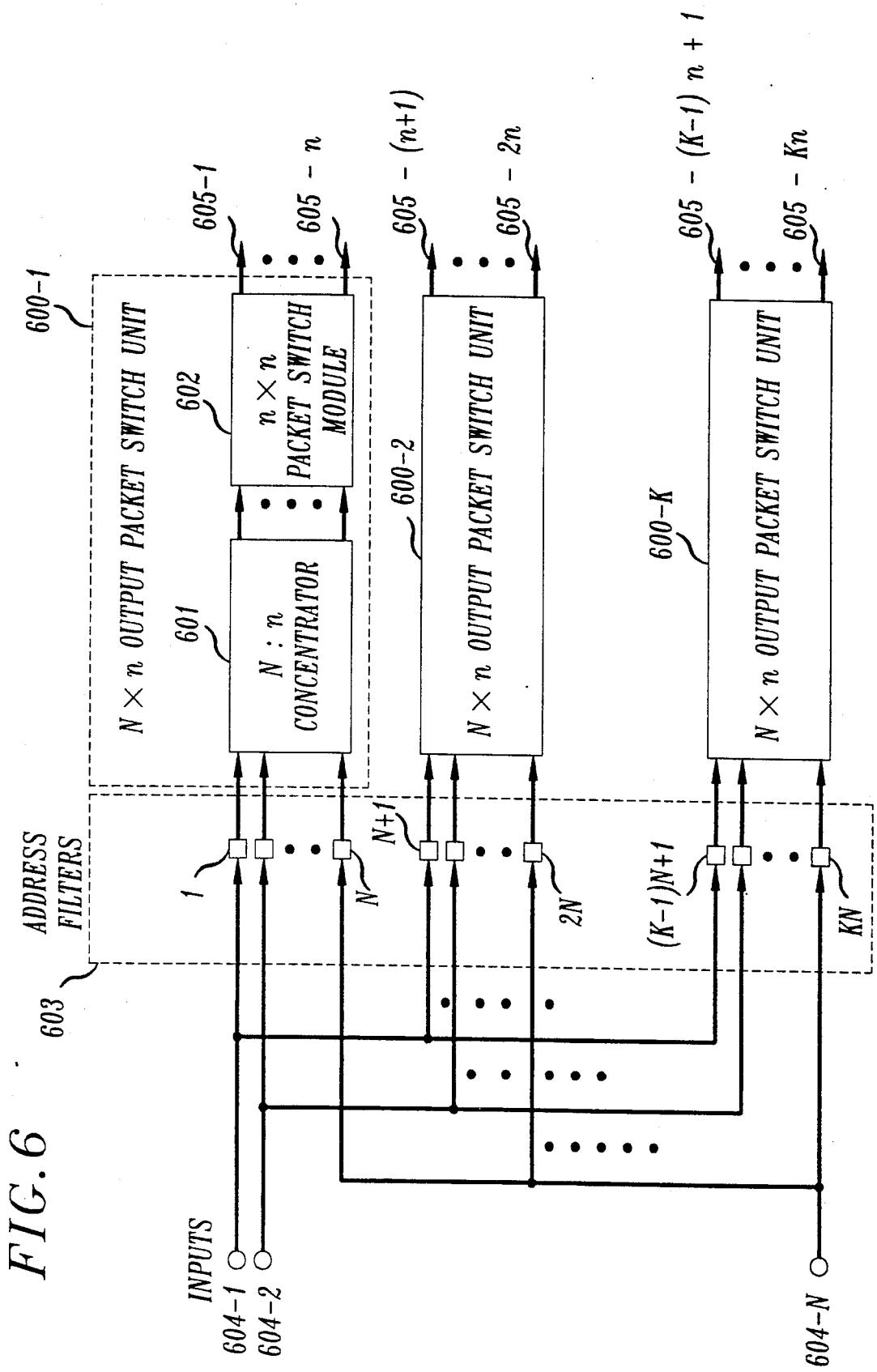
FIG. 6 depicts, in simplied block diagram form, a generalized version of an N×N packet switch matrix using the principles of the invention.

FIG. 6 shows, in simplified block diagram form, a N:N packet switch matrix based on the principles of the invention by employing a plurality of N×n output Packet Switch Units 600-1 through 600-K. Each of output Packet Switch Units 600 includes N:n Concentrators 601 and associated n×n Packet Switch Modules 602. Address filter bank 603 includes in this example address filters 1 through KN. A plurality of N address filters in address filter bank 603 is associated with each of output Packet Switch Units 600 and, therein, Concentrator 601. Specifically, address filters 1 through N in address filter bank 603 are associated with output Packet Switch Unit 600-1. A similar plurality of N address filters in address filter bank 603 are associated with Concentrators 601 in each of output Packet Switch Units 600-2 through 600-K. The address filters in address filter bank 603 operate as described above to only supply those packet cells having output addresses destined to the associated output group of Packet Switch Module 602 associated with the particular Concentrator 601, in the associated one of output Packet Switch Units 600, in essentially the same manner as described above.

Figure 7:
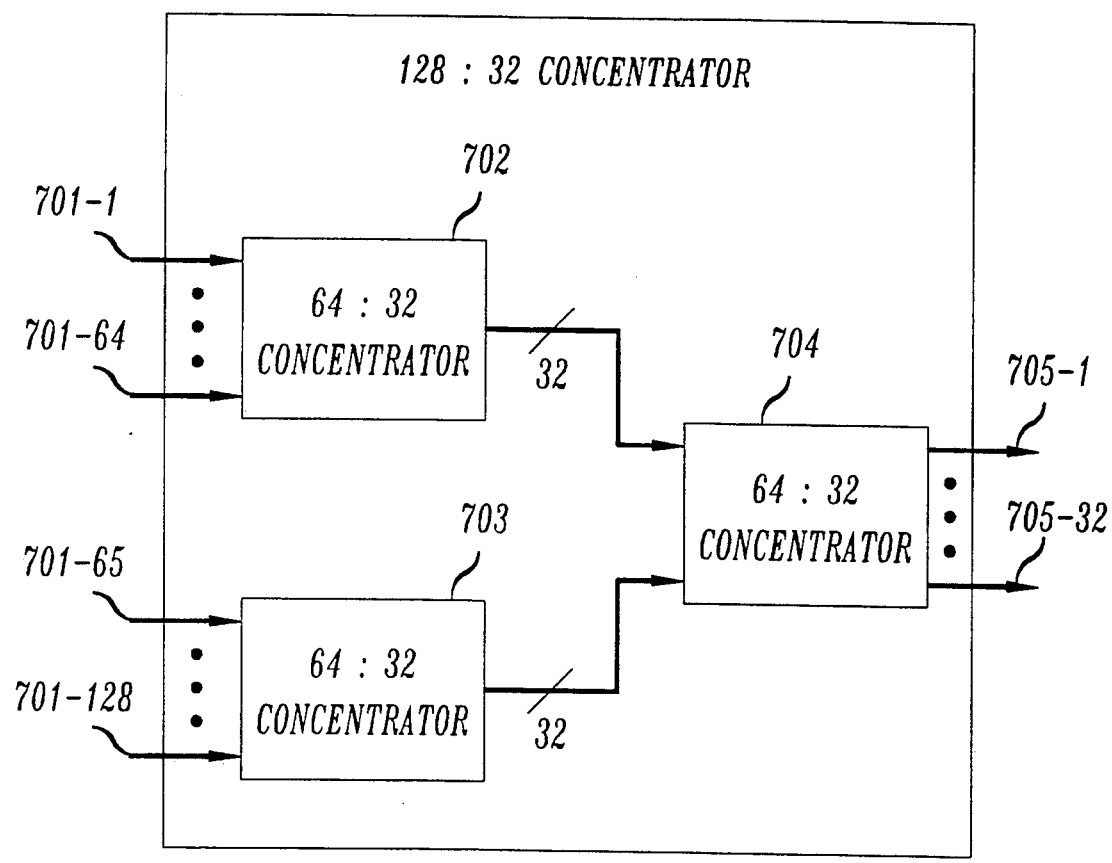
FIG. 7 shows, in simplified block diagram form, an embodiment of a "large" concentrator based on "smaller" concentrator modules.

FIG. 7 shows, in simplified block diagram form, a "larger" concentrator arrangement which is implemented by employing a plurality of "smaller" concentrators. In this example, a 128:32 concentrator is formed by employing 64:32 Concentrators 702, 703 and 704. Thus as shown, input 701-1 through 701-64 are supplied to Concentrator 702 and inputs 701-65 through 701-128 are supplied to Concentrator 703. The 32 outputs from each of Concentrators 702 and 703 are supplied as the 64 inputs to Concentrator 704 which yields outputs 705-1 through 705-32.

The above-described arrangements are, of course, merely illustrative of the application of the principles of the invention. Other arrangements may be devised by those skilled in the art without departing from the spirit or scope of the invention.

We claim:

1. An m×n (m>n) packet switch unit, where m is an integer of at least two (2) and n is an integer of at least one (1), comprising:
    a packet cell concentrator having m inputs and n outputs including means for temporarily storing arriving packet cells on the m concentrator inputs and means for supplying all of said arriving packet cells in a prescribed repetitive sequence to the n concentrator outputs, said means for temporarily storing arriving packet cells including means for temporarily storing arriving packet cells on the m concentrator inputs in arriving packet cell time slots in excess of available packet cell positions in the n concentrator outputs in output packet cell output time slots so that packet cells of any such excess of said arriving packet cells are not lost or discarded; and
    a packet switch module having n inputs and n outputs for supplying the packet cells being supplied from the n outputs of the concentrator to the n inputs of the packet switch module to appropriate ones of the n outputs of the packet switch module in accordance with an assigned destination address carried by the individual packet cells.

2. The packet switch unit as defined in claim 1, wherein said means for supplying the packet cells in said repetitive sequence includes means for supplying said arriving packet cells to the n concentrator outputs in a first-in first-out (FIFO) sequence.

3. The packet switch unit as defined in claim 2, wherein said concentrator comprises shared memory means, write control means for writing arriving packet cells on the m concentrator inputs into memory locations in said shared memory means and read control means for reading said packet cells from said shared memory means locations to the n concentrator outputs in said first-in first-out (FIFO) sequence.

4. A packet switch including a plurality of packet switch units each having m inputs and n outputs, where m is an integer of at least two (2), n is an integer of at least one (1), and m>n, each of said packet switch units comprising:
    a packet cell concentrator having m inputs and n outputs including means for temporarily storing arriving packet cells on the m concentrator inputs and means for supplying all of said arriving packet cells in a prescribed repetitive sequence to the n concentrator outputs, said means for temporarily storing arriving packet cells including means for temporarily storing arriving packet cells on the m concentrator inputs in arriving packet cell time slots in excess of available packet cell positions in the n concentrator outputs in output packet cell output time slots so that packet cells of any such excess of arriving packet cells are not lost or discarded; and
    a packet switch module having n inputs and n outputs for supplying the packet cells being supplied from the n outputs of the concentrator to the n inputs of the packet switch module to appropriate ones of the n outputs of the packet switch module in accordance with an assigned destination address carried by the individual packet cells.

5. The packet switch as defined in claim 4 further including a plurality of address filters associated on a one-to-one basis with the m inputs of the concentrator in each of said packet switch units for supplying packets to the associated concentrator destined for said packet switch module in the particular packet switch unit.

6. The packet switch as defined in claim 5, wherein said means for supplying the packet cells in said repetitive sequence includes means for supplying said arriving packet cells to the n concentrator outputs in a first-in first-out (FIFO) sequence.

7. The packet switch as defined in claim 6, wherein said concentrator comprises shared memory means, write control means for writing arriving packet cells on the m concentrator inputs into memory locations in said shared memory means and read control means for reading said packet cells from said shared memory means locations to the n concentrator outputs in said first-in first-out (FIFO) sequence.

8. In an m×n (m>n) packet switch unit, where m is an integer of at least two (2) and n is an integer of at least one (1), a method comprising the steps of:

concentrating packet cells arriving on m inputs to n outputs of an m:n (m>n) concentrator including temporarily storing arriving packet cells on the m concentrator inputs and supplying all of said arriving packet cells in a prescribed repetitive sequence to the n concentrator outputs, said step of temporarily storing arriving packet cells including temporarily storing arriving packet cells on the m concentrator inputs in arriving packet cell time slots in excess of available packet cell positions in the n concentrator outputs in output packet cell output time slots so that packet cells of any such excess of arriving packet cells are not lost or discarded; and switching the packet cells being supplied from the n outputs of the concentrator to n inputs of an n×n packet switch module to appropriate ones of n outputs of the packet switch module in accordance with an assigned destination address carried by the individual packet cells.

9. The method as defined in claim 8, wherein said step of supplying the packet cells in said repetitive sequence includes supplying said arriving packet cells to the n concentrator outputs in a first-in first-out (FIFO) sequence.

10. The method as defined in claim 9, wherein said step of concentrating includes writing arriving packet cells on the m concentrator inputs into memory locations in a shared memory and reading said packet cells from said shared memory locations to the n concentrator outputs in said first-in first-out (FIFO) sequence.

* * * * *